United States Patent
Patterson

(10) Patent No.: US 7,143,251 B1
(45) Date of Patent: Nov. 28, 2006

(54) DATA STORAGE USING IDENTIFIERS

(75) Inventor: R. Hugo Patterson, Mountain View, CA (US)

(73) Assignee: Data Domain, Inc., Santa Clara, CA (US)

( * ) Notice: Subject to any disclaimer, the term of this patent is extended or adjusted under 35 U.S.C. 154(b) by 304 days.

(21) Appl. No.: 10/611,309

(22) Filed: Jun. 30, 2003

(51) Int. Cl.
*G06F 12/16* (2006.01)

(52) U.S. Cl. .................. 711/162; 711/154; 707/201; 707/204

(58) Field of Classification Search .............. None
See application file for complete search history.

(56) References Cited

U.S. PATENT DOCUMENTS

| | | | | |
|---|---|---|---|---|
| 5,559,991 A | * | 9/1996 | Kanfi | 711/162 |
| 5,765,173 A | * | 6/1998 | Cane et al. | 707/204 |
| 2003/0005306 A1 | * | 1/2003 | Hunt et al. | 713/181 |
| 2003/0182414 A1 | * | 9/2003 | O'Neill | 709/223 |
| 2003/0204605 A1 | * | 10/2003 | Hudson et al. | 709/228 |
| 2004/0143713 A1 | * | 7/2004 | Niles et al. | 711/162 |
| 2004/0148306 A1 | * | 7/2004 | Moulton et al. | 707/101 |
| 2004/0220975 A1 | * | 11/2004 | Carpentier et al. | 707/200 |
| 2005/0172124 A1 | * | 8/2005 | Carpentier et al. | 713/165 |
| 2005/0210201 A1 | * | 9/2005 | So et al. | 711/137 |

\* cited by examiner

*Primary Examiner*—Mano Padmanabhan
*Assistant Examiner*—Kaushik Patel
(74) *Attorney, Agent, or Firm*—Van Pelt, Yi & James LLP

(57) ABSTRACT

A system and method are disclosed for processing a data stream. A data segment is received. It is determined whether the data segment has been previously stored. In the event that the data segment is determined not to have been previously stored, a unique identifier for specifying the data segment in a representation of the data stream is generated.

50 Claims, 7 Drawing Sheets

| Fingerprint | serial number |
|---|---|
| 109822845043 | 892 |
| 273276926483 | 709 |
| 309257483321 | 1 |
| ⋮ | ⋮ |
| 897266154829 | 254 |

FIG. 2A

| serial number | data location |
|---|---|
| 1 | 0X2EA50C20 |
| 2 | 0X517D29B4 |
| 3 | 0X9A684C1B |
| ⋮ | ⋮ |

FIG. 2B

| 10 | 5 | 9 | ... | 252 | 104 | 60 | 252 | ... |
|---|---|---|---|---|---|---|---|---|

FIG. 2C

| Unique ID | fingerprint | location |
|---|---|---|
| 1234 | 123479802295 | 0X1EEE2000 |
| 1235 | 123564907823 | 0X1EA0340B |
| 1238 | 123894256073 | 0X1AB57688 |
| 1239 | 123800745286 | 0X2BCD1E00 |
| 1240 | 123970529864 | 0X10D258C4 |
| 1241 | 123864379768 | 0X11DE2678 |
| ⋮ | ⋮ | ⋮ |

DATA STORAGE USING IDENTIFIERS

FIELD OF THE INVENTION

The present invention relates generally to data storage systems and methods. More specifically, a data storage system and method that efficiently eliminate redundancy is disclosed.

BACKGROUND OF THE INVENTION

As more and more data is generated by computers, the need for efficient and reliable data backup and storage systems is increasing. There are a variety of systems in existence today, utilizing both local and network storage for backup.

In some of the existing data storage systems, a data stream is segmented and then stored. The data segments are identified by content derived identifiers derived from the data in the data segments. Examples of content derived identifiers include fingerprints generated by hash algorithms and checksums calculated based on the data segments. The content derived identifiers are stored, and used for retrieving the data segments when the original data stream is reconstructed. Since identical data segments result in the same identifier, a duplicate data segment can be identified and prevented from being stored again; instead, the content derived identifier is stored every time a duplicate data segment appears, thereby making the system more efficient.

Because the content derived identifiers usually have fewer bits than the corresponding data segments, it is possible for two non-identical data segments to have the same identifier, resulting in a collision that may corrupt the data stream. The probability of collision can be lowered by generating identifiers that populate a wider range of values. Thus, it is quite common for systems to use identifiers that are 16–24 bytes or even longer. Since the same identifier is stored multiple times for identical data segments in the data stream and takes up space, the system's efficiency is typically lower if longer identifiers are used. It would be desirable to have a data storage technique that would more efficiently utilize the available storage space, without compromising the accuracy or speed of the system.

BRIEF DESCRIPTION OF THE DRAWINGS

The present invention will be readily understood by the following detailed description in conjunction with the accompanying drawings, wherein like reference numerals designate like structural elements, and in which:

FIG. 2A is a hash table used in one embodiment for determining whether a data segment has been stored previously.

FIG. 2B is a location table used in one embodiment for locating the data segments.

FIG. 2C illustrates a reconstruction list used in one embodiment for reconstructing the data stream.

DETAILED DESCRIPTION

Figure 1:
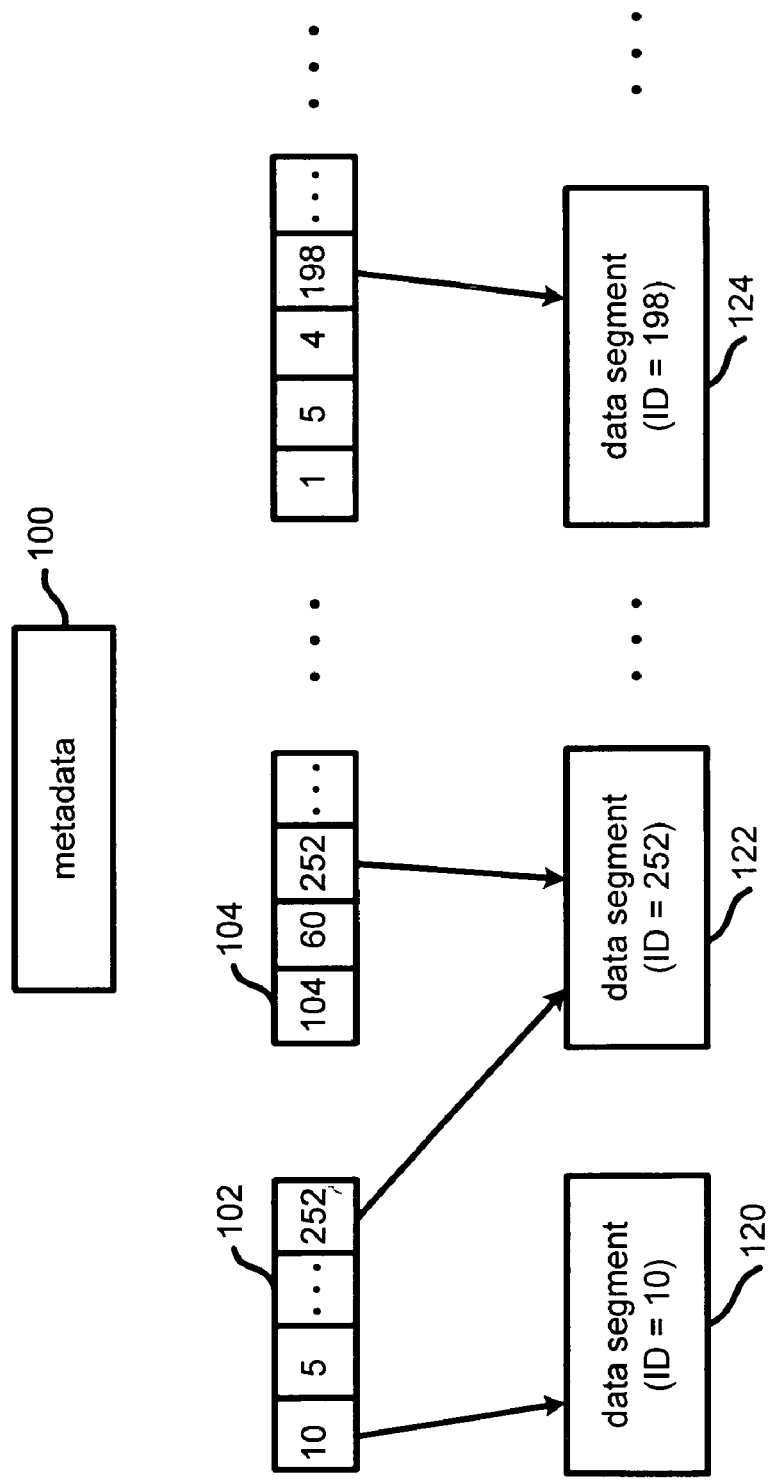
FIG. 1 is a block diagram illustrating the data organization according to one embodiment.

It should be appreciated that the present invention can be implemented in numerous ways, including as a process, an apparatus, a system, or a computer readable medium such as a computer readable storage medium or a computer network wherein program instructions are sent over optical or electronic communication links. It should be noted that the order of the steps of disclosed processes may be altered within the scope of the invention.

A detailed description of one or more preferred embodiments of the invention is provided below along with accompanying figures that illustrate by way of example the principles of the invention. While the invention is described in connection with such embodiments, it should be understood that the invention is not limited to any embodiment. On the contrary, the scope of the invention is limited only by the appended claims and the invention encompasses numerous alternatives, modifications and equivalents. For the purpose of example, numerous specific details are set forth in the following description in order to provide a thorough understanding of the present invention. The present invention may be practiced according to the claims without some or all of these specific details. For the purpose of clarity, technical material that is known in the technical fields related to the invention has not been described in detail so that the present invention is not unnecessarily obscured.

An improved data storage technique is disclosed. The technique determines whether an incoming data segment has been stored previously. If the data segment has been stored previously, it is not stored again; instead, a unique identifier is stored. The unique identifier compactly and uniquely represents every unique data segment that is received. In some embodiments, a content derived summary is also derived and used to facilitate the identification of duplicate data segments. In some embodiments, the unique identifiers and the content derived summaries are stored in one data structure for determining duplicate data segments, and the unique identifiers and the data segment locations are stored in a separate data structure for reconstructing the original data stream. In some embodiments, the unique identifiers, the content derived summaries and the data segment locations are stored together in a single data structure and used to determine duplicate data segments and reconstruct the original data stream.

Unlike the content derived identifiers used in some systems that are derived based on data in the data segments and have some probability of collision, unique identifiers are data segment identifiers that are designed to be unique and never have any collision. In some embodiments, the unique identifiers are independently generated and are not based on the data in the data segments; in some embodiments, the unique identifiers are derived from the data segments or their associated properties. The unique identifiers compactly identify the data segments and tend to be short. Preferably, the unique identifiers are shorter than other forms of segment identifiers such as segment fingerprints. Since the unique identifiers are so short, they do not rely on probability for avoiding collision; instead, they are guaranteed to be unique by the algorithms used to generate them. In some embodiments, the unique identifiers are the shortest identifier for uniquely identifying the data segments stored in the system.

FIG. 1 is a block diagram illustrating the data organization according to one embodiment. Data segments are received and stored to the appropriate data segment storage locations (120, 122, 124, etc). In this embodiment, the unique identifiers are serial numbers that are generated as the data segments are received. The serial numbers are associated with the stored data segments accordingly. Metadata 100 is used to manage a plurality of serial number blocks such as 102, 104 and 106. The serial numbers are stored in the same order as the received data segments, and used to reconstruct the data stream during the read process.

To effectively store and retrieve the data segments, the unique identifiers and the data segments are preferably organized in a way such that the duplicates are easily found and identified, and the data stream is easily reconstructed. In some embodiments, two data structures are maintained by the system: a hash table of the stored segments for determining whether a data segment has been stored previously, and a location table for locating data segments during stream reconstruction. For the purpose of example, only embodiments that use tables for data organization are discussed in detail. However, it should be noted that in different embodiments, lists, trees, databases or other appropriate data structures may also be used.

FIG. 2A is a hash table used in one embodiment for determining whether a data segment has been stored previously. In this embodiment, the unique identifiers (i.e. the serial numbers) are stored in the hash table, where a hash of the contents of the data segments is used to index into the table. To determine whether a data segment has been stored previously, the hash of the segment is computed and looked up in the table. If no segment has the same hash, the data segment is new, and its serial number is added to the appropriate location in the hash table. Otherwise, the data segment may have been stored previously. In some embodiments, if the hash is found, the data segments that correspond to the hash and the incoming data segment are compared to ascertain that the data segment has indeed been stored previously. In some embodiments, a content derived summary is stored with the unique identifier in the table. The content derived summary may be a hash, a checksum, a fingerprint, or any other appropriate construct that facilitates the determination of whether two segments have the same content. In some embodiments, if the content derived summary is a value large enough that the probability of collision is sufficiently low, then the comparison of the data segments themselves may be omitted. The hash used for the hash table is derived from the content derived summary in some embodiments and is the content derived summary itself in some embodiments. If the data segment is determined to have been stored previously, no new serial number is assigned; instead, the previously assigned serial number is reused.

FIG. 2B is a location table used in one embodiment for locating the data segments. The table is constructed during the write process of the data storage system as the data segments are received, and is used during the read process to identify the location of the data segments. The table entries are sorted according to the serial numbers and their corresponding data segment locations are stored in the table. The data segment locations are memory addresses in this example. They may be indices, database entry locations or any other appropriate indicator that can be used to locate the stored data segment.

FIG. 2C illustrates a reconstruction list used in one embodiment for reconstructing the data stream. The reconstruction list is a compressed representation of a data stream that includes a sequence of serial numbers associated with the sequence of data segments in the data stream. The list is updated during the write process as data segments are assigned serial numbers. During the read process, the data segments are sequentially retrieved from the data locations that correspond to their serial numbers, and the original data stream is reconstructed. The serial numbers in the list may or may not be unique. For example, the serial number 252 appears more than once in the list, indicating that the data segment associated with the serial number appeared more than once in the original data stream. It should be noted that other types of reconstruction lists may also be used. It may be a list, a tree, a table or any other appropriate data structure. In some embodiments, the reconstruction list includes an index or indicator of the storage location of the data segment.

It should be noted that other types of unique identifiers, content derived summaries may also be used. For example, the unique identifiers may be the addresses of the segments. In some embodiments, the stored data segments are arranged in such a way that it is efficient to look up a data segment using the data segment itself and determine whether the data segment has been stored previously. For example, the data segments can be stored in a list, a tree, a hash table, or any other appropriate data structure. In such systems, the content derived summary is the data segment itself.

Figure 3:
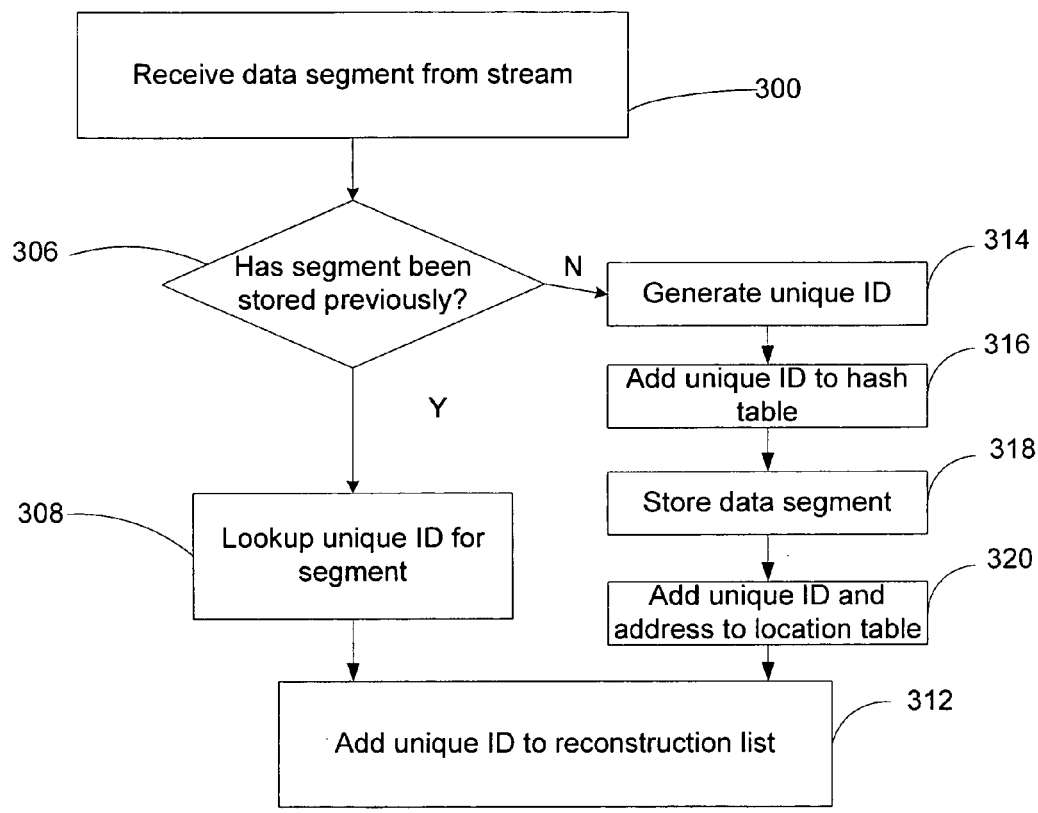
FIG. 3 is a flowchart illustrating the write process used for storing a segmented data stream, according to one embodiment.

FIG. 3 is a flowchart illustrating the write process used for storing a segmented data stream, according to one embodiment. Once a data segment is received from the data stream (300), it is determined whether the segment has been stored previously by looking up the data segment using a hash table similar to the one shown in FIG. 2A (306). It should be noted that there are many other techniques that are applicable for making the determination, such as those described in U.S. patent application Ser. No. 10/325,690 by Zhu, et al entitled: "EFFICIENT DATA STORAGE SYSTEM" which is incorporated by reference for all purposes; and those described in U.S. patent application Ser. No. 10/325,479 by Zhu, et al entitled "EFFICIENT DATA STORAGE SYSTEM" which is incorporated by reference for all purposes. If it is determined that the data segment has been stored previously, the unique identifier for the data segment is looked up (308). The unique identifier is then added to the reconstruction list (312). If, however, it is determined that the data segment has not been stored previously, a unique identifier is generated for the data segment using an appropriate ID generation algorithm (314). The unique identifier is added to the hash table (316), the data segment is stored (318), both the unique identifier and the address of the stored data segment are added to the location table (320), and the unique identifier is added to the reconstruction list (312).

Figure 4:
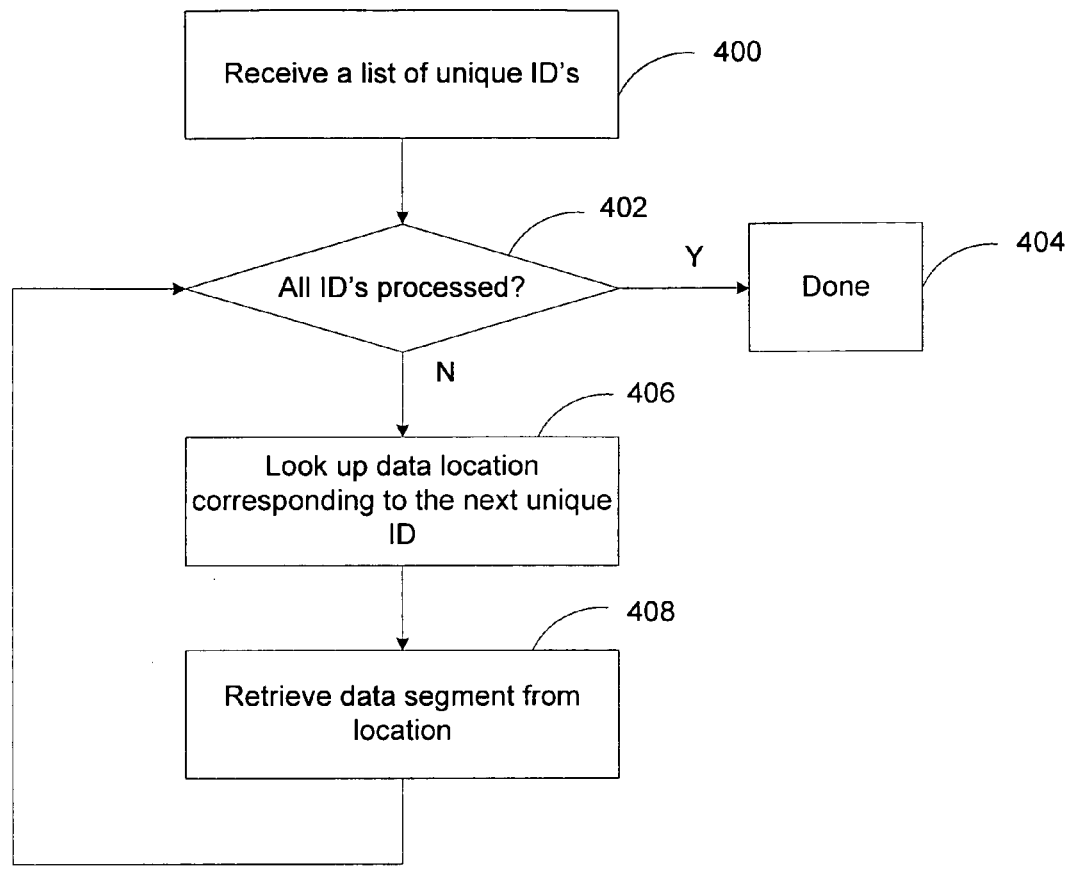
FIG. 4 is a flowchart illustrating the read process according to one embodiment.

FIG. 4 is a flowchart illustrating the read process according to one embodiment. A list of unique identifiers is received (400). It is then determined whether all the unique identifiers in the list have been processed (402). If not all of the unique identifiers have been processed, then the data location that corresponds to the next unique identifier in the list is looked up (406). The data segment is then retrieved from the data location (408). Control is then transferred to 402 to once again determine whether all the unique identifiers have been processed. If it is determined that all of the unique identifiers have been processed, then the read process is finished (404); otherwise, 406 and 408 are repeated.

Although the previously described technique provides a more efficient way to manage the data segments and reduces the amount of space required to store duplicate data, certain problems remain. First, the maintenance of two tables is cumbersome. Second, the unique identifiers have no correlation with the content of the data segments and do not provide any additional verification of the correctness of the data. To address these issues, in some embodiments, a combined table is used for both the reading and the writing of data.

Figures 5A, 5B:
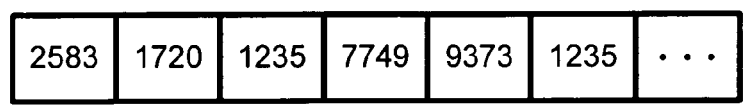
FIG. 5A illustrates a combined table used in one embodiment. The table is used for both the write process and the read process.
FIG. 5B illustrates another reconstruction list that is a compressed representation of a data stream.

FIG. 5A illustrates a combined table used in one embodiment. The table is used for both the write process and the read process. The unique identifiers, content derived summaries and data segment locations are stored in the same table. The data segment location can be found by looking up the unique identifier in the table; it can also be found by looking up the content derived summary in the table. This is possible because the unique identifier and the content derived summary hash to a region that includes a small number of adjoining buckets in the hash table. The data segment location or the region that includes the data segment location may be found using a single access of the storage device that stores the hash table. The content derived summaries are fingerprints of the data segments and the unique identifiers are derived using the first four bytes of the fingerprint. The size of the fingerprint is implementation dependent. The table entries are sorted according to the values of the unique identifiers.

It should be noted that there are various techniques for generating unique identifiers and organizing the hash table so that the identifiers and the data segment hash to the same region of the table. For example, the unique identifier may be derived based on a candidate identifier comprising N number of bytes selected from the content derived summary; it may be derived based on a candidate identifier that is a checksum or a hash computed using the value of the content derived summary. The candidate identifier may be further modified to avoid collision. In one embodiment, the unique identifier is a value derived from the content derived summary combined with a serial number used to avoid collision (for example, the unique identifier may be an eight byte value, whose first six bytes are derived from a fingerprint, and last two bytes are a serial number). A unique identifier is often chosen as a compact and unique representation of the data segment that can be looked up quickly.

FIG. 5B illustrates another reconstruction list that is a compressed representation of a data stream. The list is implemented as a sequence of unique identifiers associated with the sequence of data segments in a data stream. As data segments are received during the write process, their corresponding unique identifiers are added to the list. During the read process, the data locations corresponding to the unique identifiers are looked up in the combined table, the data segments are retrieved and the original data stream is reconstructed. A duplicate unique identifier such as 1235 in the sequence indicates that its corresponding data segment appears more than once in the data stream.

Figure 6:
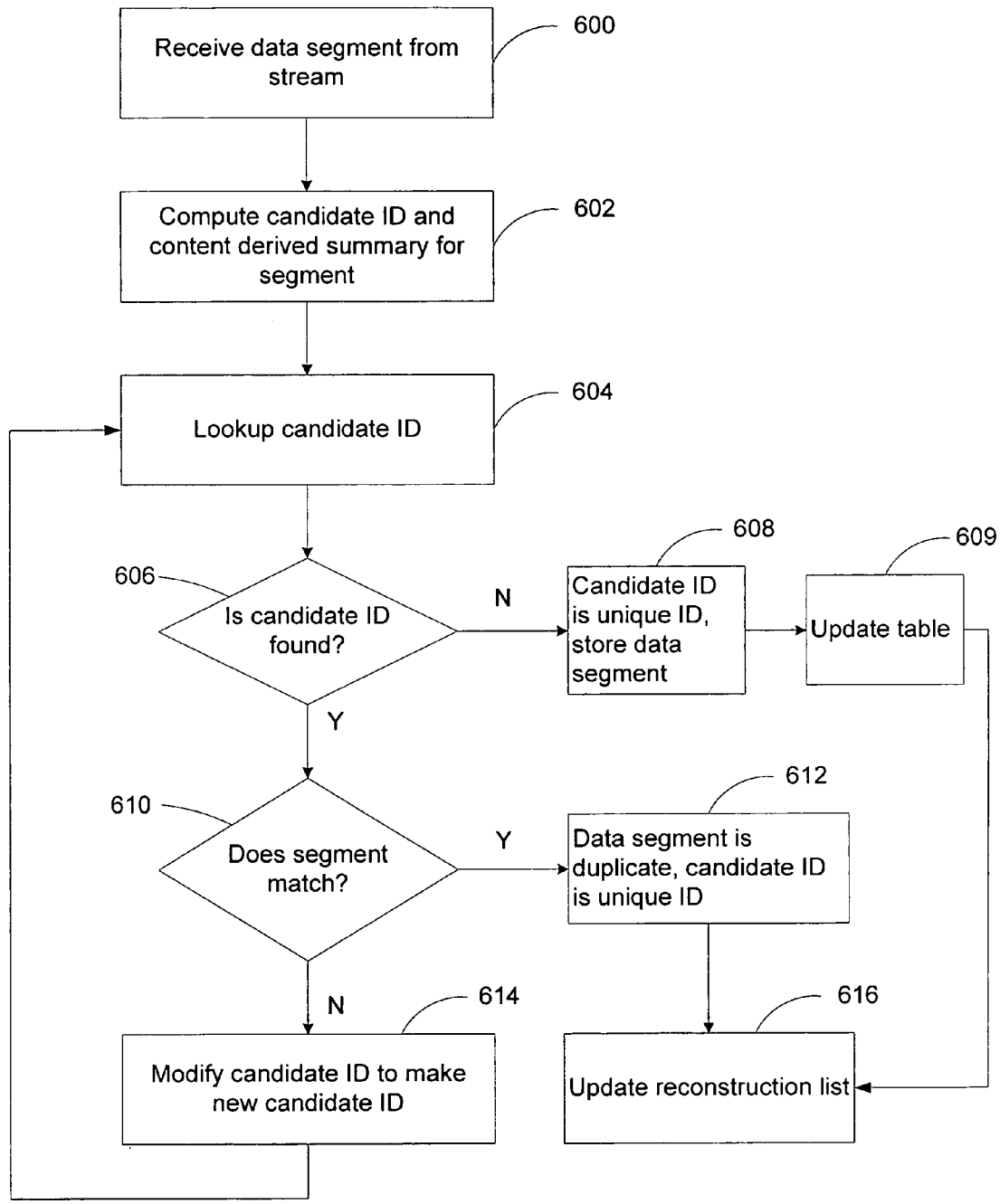
FIG. 6 is a flowchart illustrating a write process according to an embodiment that uses a combined table similar to the one shown in FIG. 5.

FIG. 6 is a flowchart illustrating a write process according to an embodiment that uses a combined table similar to the one shown in FIG. 5. Once the system receives a data segment from the stream (600), it computes a content derived summary and a candidate identifier for the data segment (602). The candidate identifier may or may not become the final unique identifier used for the data segment, depending on whether there is a collision in the table. The candidate identifier is looked up in the table (604). It is then determined whether the candidate identifier is found in the table (606). If the candidate identifier is not found, then the candidate identifier is not in use and the candidate identifier becomes the unique identifier for the data segment. Accordingly, the new data segment is stored (608) and a new entry including the data segment's unique identifier, content addressable identifier and location is updated in the table (609). The reconstruction list is also updated (616).

If the candidate identifier is found in the table, it is then determined whether there is a stored data segment that matches the received data segment (610). In some embodiments, to make the determination, the content derived summary of the data segment is looked up in the table. If a matching content derived summary is found, then the data segment is a duplicate and is not stored again (612). Consequently, the candidate identifier is the same as the unique identifier of the stored data segment and the reconstruction list is updated to include the unique identifier. If the content derived summary in the table does not match that of the data segment, the candidate identifier is then modified to generate a new candidate identifier that is unique (614). Control is then transferred to 604 and the process is repeated for the new candidate identifier.

The process described above can be illustrated using the examples shown in FIGS. 5A–5B. In this embodiment, to determine whether a data segment has been stored previously, its fingerprint is looked up in the table. An identical fingerprint found in the table means that an identical data segment has been stored previously. In some embodiments, the data in the data segments are compared directly to determine whether the data segment has been stored previously.

In one example, a data segment with a fingerprint of 123564907823 is stored and given a unique identifier of 1235. The table entries are updated accordingly and the unique identifier is added to the construction list. Later, when the same data segment appears again in the stream, it is given a candidate identifier of 1235 (602 of FIG. 6). The candidate identifier is looked up (604) and is found in the table (606). It is determined that the newly received data segment matches the stored data segment (610), therefore the data segment is a duplicate and is not stored again (612). The candidate identifier 1235 is the unique identifier of the data segment, and is stored again in the construction list so that the data segment may be properly retrieved during the reconstruction.

In another example, a data segment with a fingerprint of 123894256073 and unique identifier of 1238 has been stored previously. A newly received data segment has a fingerprint of 123800745286. The candidate identifier of the new data segment is set to 1238 (602). The candidate identifier is looked up in the table (604). It is then determined whether the candidate identifier is found in the table (606). In this case, identifier 1238 already exists in the table. It should be noted that finding a unique identifier in the table does not necessarily indicate that a duplicate data segment exists. To further determine whether the new data segment is identical to the stored data segment, the data segments or their fingerprints are compared (610). Since the fingerprints do not match, the data segments do not match, and the candidate identifier of the newly received data segment is incremented to 1239 to avoid collision (614). The new candidate identifier is looked up again (604). This time, no entry with a unique identifier of 1239 is found in the table. The data segment is stored (608), the table is updated (609) and the construction list is also updated (616).

There are many techniques for modifying the candidate identifier to avoid collision. In some embodiments, the candidate identifier is incremented repeatedly until a new and unique identifier is obtained; in some embodiments, a serial number is appended to the candidate identifier to make it unique. In some embodiments, the candidate identifier is decremented. In some embodiments, the system searches for consecutive identifier values until there is a break in the numbering. In the example shown in FIG. 5A, a new data segment with a fingerprint of 123864379768 has a candidate identifier of 1238. However, since unique identifiers of 1238, 1239 and 1240 already exist in the table, the candidate identifier of the new data segment is incremented until a break in numbering is found at 1241. In some embodiments, the system tracks the maximum number of increments made in order to make a candidate identifier unique. This number is also referred to as the search distance. The search for a duplicate data segment starts from the content derived summary that corresponds to the matching unique identifier, and extends to the neighboring identifiers within the search distance. In this example, the search distance is three. If a data segment that results in a candidate identifier of 1238 is received, the search for its duplicate starts with the table entry that has a unique identifier of 1238, and extends to the next three neighboring entries. In some embodiments, the unique identifier and candidate identifier are computed in a way that naturally allows gaps between different fingerprints so that the chances of collision and the search distance are both minimized. In some embodiments, the unique identifier is formed by using a checksum computed based on the content addressable identifier combined with a serial number that is generated sequentially for each data segment that results in the same checksum.

Figure 7:
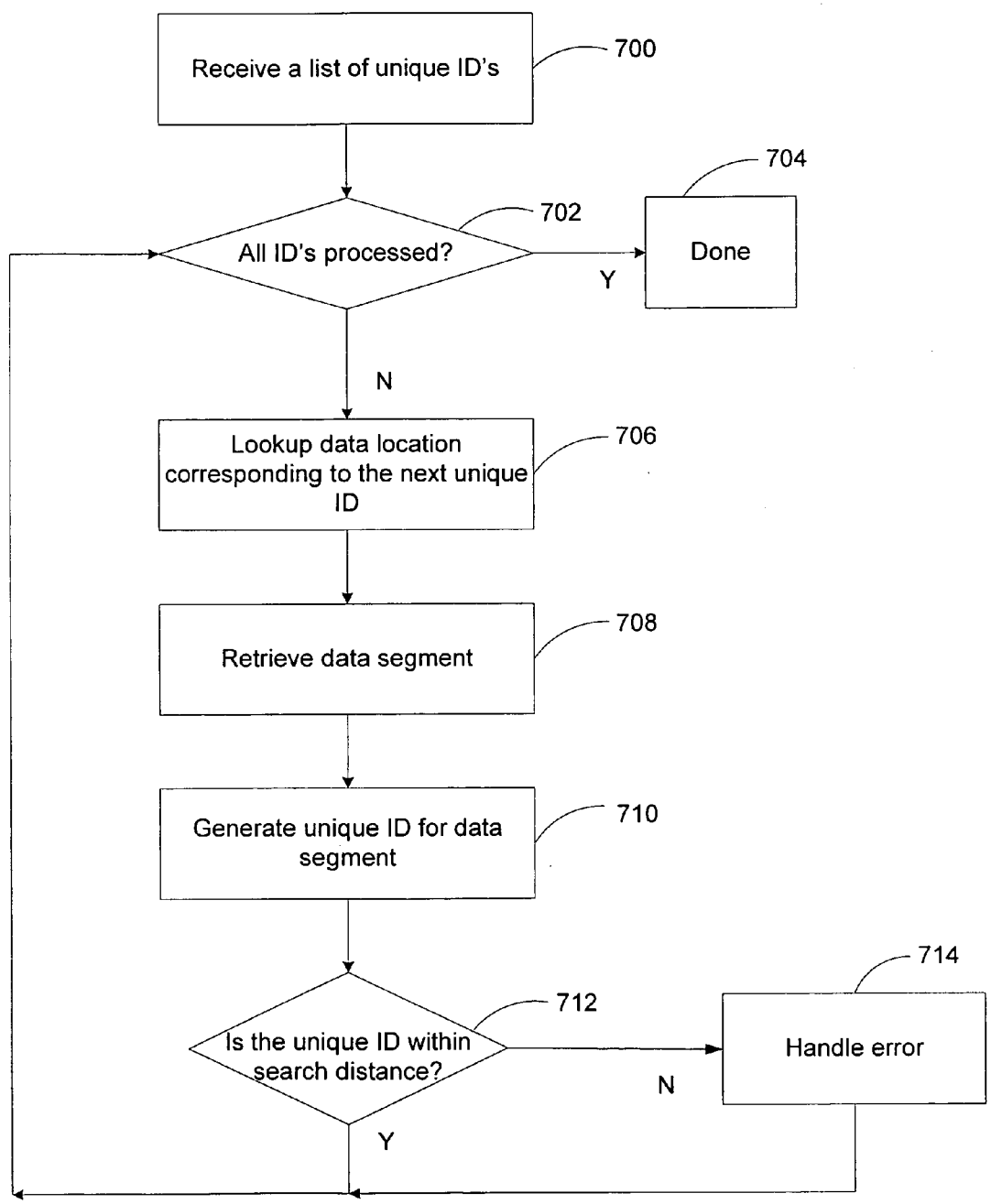
FIG. 7 is a flowchart illustrating a read process according to an embodiment that uses a table similar to the one shown in FIG. 5A.

FIG. 7 is a flowchart illustrating a read process according to an embodiment that uses a table similar to the one shown in FIG. 5A. A list of unique identifiers is received (700). It is then determined whether all the unique identifiers in the list have been processed (702). If not all of the unique identifiers have been processed, then the data location that corresponds to the next unique identifier in the list is looked up (706). The data segment is then retrieved from the data location (708).

In this embodiment, the system also performs an additional check to verify that the data segment is indeed the one that corresponds to the unique identifier. A unique identifier is generated based on the data segment (710). It is then determined whether the unique identifier is within the search distance (712). If the unique identifier is not within the search distance, then an error has occurred and should be handled (714). In some embodiments, the corrupt data segment is ignored. If the unique identifier is within the search distance, then the data segment located is valid, and control is then transferred to step 702 to once again determine whether all the unique identifiers have been processed. If it is determined that all of the unique identifiers have been processed, then the read process is finished (704); otherwise, the lookup, retrieval and verification steps are repeated. It should be noted that checking steps 710–714 are optional and may be omitted in some embodiments.

An improved data storage technique has been disclosed. The technique efficiently utilizes the available storage space, provides good performance and accuracy.

Although the foregoing invention has been described in some detail for purposes of clarity of understanding, it will be apparent that certain changes and modifications may be practiced within the scope of the appended claims. It should be noted that there are many alternative ways of implementing both the process and apparatus of the present invention. Accordingly, the present embodiments are to be considered as illustrative and not restrictive, and the invention is not to be limited to the details given herein, but may be modified within the scope and equivalents of the appended claims.

What is claimed is:

1. A method for processing a data stream comprising:
   receiving a data segment;
   determining whether the data segment has been previously stored; and
   in the event that the data segment is determined not to have been previously stored, generating a unique identifier for specifying the data segment in a representation of the data stream;
   wherein determining whether the data segment has been previously stored includes generating a candidate identifier; and determining whether the candidate identifier has been stored previously.

2. A method for processing a data stream as recited in claim 1 wherein determining whether the data segment has been previously stored includes generating a content derived summary.

3. A method for processing a data stream as recited in claim 1 wherein determining whether the data segment has been previously stored includes generating a content derived summary for the data segment; and the content derived summary is a fingerprint.

4. A method for processing a data stream as recited in claim 1 wherein determining whether the data segment has been previously stored includes looking up a content derived summary for the data segment; and the content derived summary is the data segment.

5. A method for processing a data stream as recited in claim 1 wherein determining whether the data segment has been previously stored includes generating a content derived summary for the data segment; and locating the content derived summary in a content derived summary storage.

6. A method for processing a data stream as recited in claim 1 wherein determining whether the data segment has been previously stored includes locating the data segment in a data segment storage.

7. A method for processing a data stream as recited in claim 1 wherein in the event that the data segment is determined not to have been previously stored, further including storing the data segment in a data segment storage location.

8. A method for processing a data stream as recited in claim 1 wherein:
   determining whether the data segment has been previously stored includes generating a content derived summary for the data segment;
   in the event that the data segment is determined not to have been previously stored, further including:
      storing the data segment in a data segment storage location; and
      updating a data structure for storing the content derived summary, the unique identifier, and the data segment storage location.

9. A method for processing a data stream as recited in claim 1 wherein:
   determining whether the data segment has been previously stored includes generating a content derived summary for the data segment;
   in the event that the data segment is determined not to have been previously stored, further including:
      storing the data segment in a data segment storage location; and updating a data structure for storing the content derived summary, the unique identifier, and the data segment storage location; wherein the data segment storage location is accessed given the unique identifier or given the content derived summary in the data structure.

10. A method for processing a data stream as recited in claim 1 wherein:

determining whether the data segment has been previously stored includes generating a content derived summary for the data segment;

in the event that the data segment is determined not to have been previously stored, further including:

storing the data segment in a data segment storage location; and updating a data structure for storing the content derived summary, the unique identifier, and the data segment storage location; wherein the data segment storage location is accessed given the unique identifier or given the content derived summary, using a single access of a storage device.

11. A method for processing a data stream as recited in claim 1 wherein:

determining whether the data segment has been previously stored includes generating a content derived summary for the data segment;

in the event that the data segment is determined not to have been previously stored, further including:

storing the data segment in a data segment storage location; and updating a data structure for storing the content derived summary, the unique identifier, and the data segment storage location; wherein a region of the data structure that includes the data segment storage location is accessed given the unique identifier or given the content derived summary, using a single access of a storage device.

12. A method for processing a data stream as recited in claim 1, wherein the unique identifier does not depend on probability for its uniqueness, and is shorter than a signature of the data segment.

13. A method for processing a data stream as recited in claim 1, wherein the unique identifier is a serial number.

14. A method for processing a data stream as recited in claim 1, wherein the unique identifier is derived from a hash value.

15. A method for processing a data stream as recited in claim 1, wherein the unique identifier is an address of the data segment.

16. A method for processing a data stream as recited in claim 1, wherein the unique identifier is a shortest identifier for uniquely identifying the data segment.

17. A method for processing a data stream as recited in claim 1, wherein determining whether the data segment has been previously stored includes generating a content derived summary for the data segment; and the unique identifier is derived from the content derived summary.

18. A method for processing a data stream as recited in claim 1, wherein determining whether the data segment has been previously stored includes generating a content derived summary for the data segment; and the unique identifier includes a value derived from the content derived summary and a serial number.

19. A method for processing a data stream as recited in claim 1, wherein the representation of the data stream is a compressed representation.

20. A method for processing a data stream as recited in claim 1, wherein the representation of the data stream is used for reconstructing the data stream.

21. A method for processing a data stream as recited in claim 1, wherein:

generating a unique identifier for specifying the data segment includes modifying the candidate identifier.

22. A method for processing a data stream as recited in claim 21, wherein modifying the candidate identifier includes adding a value to the candidate identifier.

23. A method for processing a data stream as recited in claim 21, wherein modifying the candidate identifier includes combining an additional bit with the candidate identifier.

24. A method for processing a data stream as recited in claim 21, wherein modifying the candidate identifier includes combining a plurality of bits with the candidate identifier.

25. A method for processing a data stream as recited in claim 1, wherein the unique identifier is stored in a reconstruction list.

26. A method for processing a data stream as recited in claim 1, in the event that the data segment is determined to have been previously stored, further including locating a unique identifier previously assigned to the data segment.

27. A method for processing a data stream as recited in claim 1, in the event that the data segment is determined to have been previously stored, further including locating a unique identifier previously assigned to the data segment; and the unique identifier is stored in a reconstruction list.

28. A method for processing a data stream as recited in claim 1, further comprising:

in the event that the data segment is determined not to have been previously stored, storing the data segment.

29. A system for processing a data stream comprising:

an interface configured to receive a data segment;

a processor coupled to the interface, configured to:

determine whether the data segment has been previously stored; and in the event that the data segment is determined not to have been previously stored, generate a unique identifier for specifying the data segment in a representation of the data stream;

wherein to determine whether the data segment has been previously stored includes to generate a candidate identifier; and to determine whether the candidate identifier has been stored previously.

30. A computer program product for processing a data stream, the computer program product being embodied in a computer readable storage medium and comprising computer instructions for:

receiving a data segment;

determining whether the data segment has been previously stored; and in the event that the data segment is determined not to have been previously stored, generating a unique identifier for specifying the data segment in a representation of the data stream;

wherein determining whether the data segment has been previously stored includes generating a candidate identifier; and determining whether the candidate identifier has been stored previously.

31. A system as recited in claim 29, wherein to determine whether the data segment has been previously stored includes to generate a content derived summary.

32. A system as recited in claim 29, wherein to determine whether the data segment has been previously stored includes to locate the data segment in a data segment storage.

33. A system as recited in claim 29, wherein in the event that the data segment is determined not to have been previously stored, the processor is further configured to store the data segment in a data segment storage location.

34. A system as recited in claim 29, wherein the unique identifier does not depend on probability for its uniqueness, and is shorter than a signature of the data segment.

35. A system as recited in claim 29, wherein to determine whether the data segment has been previously stored includes to generate a content derived summary for the data segment; and the unique identifier is derived from the content derived summary.

36. A system as recited in claim 29, wherein to determine whether the data segment has been previously stored includes to generate a content derived summary for the data segment; and the unique identifier includes a value derived from the content derived summary and a serial number.

37. A system as recited in claim 29, wherein the representation of the data stream is a compressed representation.

38. A system as recited in claim 29, wherein the representation of the data stream is used for reconstructing the data stream.

39. A system as recited in claim 29, wherein the unique identifier is stored in a reconstruction list.

40. A system as recited in claim 29, in the event that the data segment is determined to have been previously stored, the processor is further configured to locate a unique identifier previously assigned to the data segment.

41. A computer program product as recited in claim 30, wherein determining whether the data segment has been previously stored includes generating a content derived summary.

42. A computer program product as recited in claim 30, wherein determining whether the data segment has been previously stored includes locating the data segment in a data segment storage.

43. A computer program product as recited in claim 30, wherein in the event that the data segment is determined not to have been previously stored, the computer program product further comprising computer instructions for storing the data segment in a data segment storage location.

44. A computer program product as recited in claim 30, wherein the unique identifier does not depend on probability for its uniqueness, and is shorter than a signature of the data segment.

45. A computer program product as recited in claim 30, wherein determining whether the data segment has been previously stored includes generating a content derived summary for the data segment; and the unique identifier is derived from the content derived summary.

46. A computer program product as recited in claim 30, wherein determining whether the data segment has been previously stored includes generating a content derived summary for the data segment; and the unique identifier includes a value derived from the content derived summary and a serial number.

47. A computer program product as recited in claim 30, wherein the representation of the data stream is a compressed representation.

48. A computer program product as recited in claim 30, wherein the representation of the data stream is used for reconstructing the data stream.

49. A computer program product as recited in claim 30, wherein the unique identifier is stored in a reconstruction list.

50. A computer program product as recited in claim 30, in the event that the data segment is determined to have been previously stored, the computer program product further comprising computer instructions for locating a unique identifier previously assigned to the data segment.

* * * * *